(12) United States Patent
Nahvi

(10) Patent No.: US 12,210,471 B2
(45) Date of Patent: Jan. 28, 2025

(54) SCHEDULING TECHNIQUES FOR ISOCHRONOUS IN TRAFFIC IN A USB EXTENSION ENVIRONMENT

(71) Applicant: Icron Technologies Corporation, Burnaby (CA)

(72) Inventor: Mohsen Nahvi, North Vancouver (CA)

(73) Assignee: Icron Technologies Corporation, Burnaby (CA)

( * ) Notice: Subject to any disclaimer, the term of this patent is extended or adjusted under 35 U.S.C. 154(b) by 0 days.

(21) Appl. No.: 18/478,827

(22) Filed: Sep. 29, 2023

(65) Prior Publication Data

US 2024/0028542 A1 Jan. 25, 2024

Related U.S. Application Data

(63) Continuation of application No. 17/512,305, filed on Oct. 27, 2021, now Pat. No. 11,803,498.

(60) Provisional application No. 63/107,914, filed on Oct. 30, 2020.

(51) Int. Cl.
*G06F 13/38* (2006.01)
(52) U.S. Cl.
CPC .......... *G06F 13/385* (2013.01); *G06F 13/387* (2013.01); *G06F 2213/0042* (2013.01)
(58) Field of Classification Search
CPC ..................... G06F 385/387; G06F 2213/0042
See application file for complete search history.

(56) References Cited

U.S. PATENT DOCUMENTS

| | | | |
|---|---|---|---|
| 6,708,247 B1 | 3/2004 | Barret et al. | |
| 6,735,658 B1 | 5/2004 | Thornton | |
| 6,961,798 B2 | 11/2005 | Ferguson | |
| 10,827,271 B1 | 11/2020 | Renna et al. | |
| 2004/0268012 A1 | 12/2004 | Ferguson | |
| 2011/0208892 A1* | 8/2011 | Meyers | G06F 13/385 710/313 |
| 2012/0117278 A1 | 5/2012 | Salamon et al. | |
| 2013/0132625 A1 | 5/2013 | Hall | |
| 2015/0074312 A1 | 3/2015 | Barus et al. | |
| 2016/0125838 A1 | 5/2016 | Hundal et al. | |
| 2017/0373881 A1 | 12/2017 | Yu et al. | |
| 2018/0189224 A1 | 7/2018 | Vadivelu et al. | |
| 2018/0307293 A1 | 10/2018 | Lambert et al. | |
| 2019/0025872 A1 | 1/2019 | Li et al. | |
| 2019/0102333 A1 | 4/2019 | Hundal et al. | |
| 2020/0034107 A1 | 1/2020 | Kulkarni et al. | |

(Continued)

*Primary Examiner* — Henry Tsai
*Assistant Examiner* — Aurangzeb Hassan
(74) *Attorney, Agent, or Firm* — Christensen O'Connor Johnson Kindness PLLC

(57) ABSTRACT

In some embodiments, a system for communicating USB information via a non-USB extension medium is provided. The system comprises a downstream facing port device (DFP device). The DFP device is configured to receive, via the non-USB extension medium, an ACK IN packet addressed to a first endpoint while receiving DATA packets from a second endpoint. The DFP device is further configured to detect an end of transmission of the DATA packets from the second endpoint; determine a number of packets that can be received from the first endpoint during a remaining amount of time in a current bus interval; and transmit at least one synthetic ACK IN packet to the first endpoint based on the number of packets.

18 Claims, 11 Drawing Sheets

(56) References Cited

U.S. PATENT DOCUMENTS

| | | |
|---|---|---|
| 2022/0092017 A1 | 3/2022 | Nahvi |
| 2022/0138137 A1 | 5/2022 | Nahvi |
| 2022/0309022 A1 | 9/2022 | Nahvi |

* cited by examiner

SCHEDULING TECHNIQUES FOR ISOCHRONOUS IN TRAFFIC IN A USB EXTENSION ENVIRONMENT

CROSS REFERENCE TO RELATED APPLICATION

This application is a continuation of U.S. patent application Ser. No. 17/512,305, filed Oct. 27, 2021, which claims the benefit of Provisional Application No. 63/107,914, filed Oct. 30, 2020, the entire disclosures of which are hereby incorporated by reference herein for all purposes.

BACKGROUND

USB is a peripheral interface for attaching a wide variety of computing devices, such as personal computers, digital telephone lines, monitors, modems, mice, printers, scanners, game controllers, keyboards, storage devices, and/or the like. The specifications defining USB (e.g., Intel et al., Universal Serial Bus Specification, Revision 1.0, January 1996; updated as Revision 1.1 in September 1998; further updated as Revision 2.0 in April 2000; further updated as Revision 3.0 in November 2008; released as Universal Serial Bus 3.1 Specification Revision 1.0 in July 2013; released as Universal Serial Bus 3.2 Specification Revision 1.0 on Sep. 22, 2017, and subsequent updates and modifications—hereinafter collectively referred to as the "USB Specifications", which term can include future modifications and revisions) are non-proprietary and are managed by an open industry organization known as the USB Forum. The USB Specifications establish basic criteria that must be met in order to comply with USB standards. One of ordinary skill in the art will recognize many terms herein from the USB Specifications. Those terms are used herein in a similar manner to their use in the USB Specifications, unless otherwise stated.

Under Revision 3.1 of the USB Specifications, SuperSpeed connections are provided that use a 5 Gbps (Gen 1) or 10 Gbps (Gen 2) signaling rate. Though the specification does not mandate any particular maximum cable length, in practical terms the timing mandates and signaling techniques require a regular copper cable used for a SuperSpeed connection between a host and a device to be at most 3 meters long to properly support the SuperSpeed connection. Therefore, a new method and apparatus are needed to optionally allow for extension of a SuperSpeed USB device to a greater distance from the host to which it is coupled, such that SuperSpeed USB packets may be propagated between the host and the USB device.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for communicating USB information via an extension medium is provided. The system comprises an upstream facing port device (UFP device) and a downstream facing port device (DFP device). The UFP device is communicatively coupled to a host device via a USB-compliant connection. The DFP device is communicatively coupled to at least one USB device via a USB-compliant connection and communicatively coupled to the UFP device via a non-USB extension medium. The DFP device is configured to receive, from the UFP device via the extension medium, a first ACK IN packet addressed to a first endpoint; receive, from the UFP device via the extension medium, a second ACK IN packet addressed to a second endpoint after receiving the first ACK IN packet; and, in response to detecting that the USB-compliant connection is available: compare a bInterval value for the first endpoint to a bInterval value for the second endpoint; and in response to determining that the bInterval value for the second endpoint is smaller than the bInterval value for the first endpoint, transmit a synthetic ACK IN packet to the second endpoint based on the second ACK IN packet.

In some embodiments, a method of enabling communication between a host device and at least one USB device via a non-USB extension medium is provided. A downstream facing port device (DFP device) receives, from an upstream facing port device (UFP device) via the non-USB extension medium, a first ACK IN packet addressed to a first endpoint. The DFP device receives, from the UFP device via the non-USB extension medium, a second ACK IN packet addressed to a second endpoint after receiving the first ACK IN packet. In response to detecting that a USB-compliant connection between the DFP device and at least one USB device is available, the DFP device compares a bInterval value for the first endpoint to a bInterval value for the second endpoint; and in response to determining that the bInterval value for the second endpoint is smaller than the bInterval value for the first endpoint, the DFP device transmits a synthetic ACK IN packet to the second endpoint based on the second ACK IN packet.

In some embodiments, a downstream facing port device (DFP device) is provided. The DFP device comprises a USB downstream-facing port configured to be communicatively coupled to one or more USB devices, and an extension interface configured to be communicatively coupled to an upstream facing port device (UFP device) via a non-USB extension medium. The DFP device is configured to receive, from the UFP device via the extension medium, a first ACK IN packet addressed to a first endpoint; receive, from the UFP device via the extension medium, a second ACK IN packet addressed to a second endpoint after receiving the first ACK IN packet; and in response to detecting that the USB-compliant connection is available: compare a bInterval value for the first endpoint to a bInterval value for the second endpoint; and in response to determining that the bInterval value for the second endpoint is smaller than the bInterval value for the first endpoint, transmit a synthetic ACK IN packet to the second endpoint based on the second ACK IN packet.

In some embodiments, a system for communicating USB information via an extension medium is provided. The system comprises an upstream facing port device (UFP device) and a downstream facing port device (DFP device). The UFP device is communicatively coupled to a host device via a USB-compliant connection. The DFP device is communicatively coupled to at least one USB device via a USB-compliant connection and communicatively coupled to the UFP device via a non-USB extension medium. The DFP device is configured to receive, from the UFP device via the extension medium, an ACK IN packet addressed to a first endpoint while receiving DATA packets from a second endpoint; detect an end of transmission of the DATA packets from the second endpoint; determine a number of packets that can be received from the first endpoint during a remaining amount of time in a current bus interval; and transmit at least one synthetic ACK IN packet to the first endpoint based on the number of packets.

In some embodiments, a method of enabling communication between a host device and at least one USB device via a non-USB extension medium is provided. A downstream facing port device (DFP device) receives, from an upstream facing port device UFP device) via the non-USB extension medium, an ACK IN packet addressed to a first endpoint while receiving DATA packets from a second endpoint. The DFP device detects an end of transmission of the DATA packets from the second endpoint. The DFP device determines a number of packets that can be received from the first endpoint during a remaining amount of time in a current bus interval. The DFP device transmits at least one synthetic ACK IN packet to the first endpoint based on the number of packets.

In some embodiments, a downstream facing port device (DFP device) is provided. The DFP device comprises a USB downstream-facing port configured to be communicatively coupled to one or more USB devices, and an extension interface configured to be communicatively coupled to an upstream facing port device (UFP device) via a non-USB extension medium. The DFP device is configured to receive, from the UFP device via the extension medium, an ACK IN packet addressed to a first endpoint while receiving DATA packets from a second endpoint; detect an end of transmission of the DATA packets from the second endpoint; determine a number of packets that can be received from the first endpoint during a remaining amount of time in a current bus interval; and transmit at least one synthetic ACK IN packet to the first endpoint based on the number of packets.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
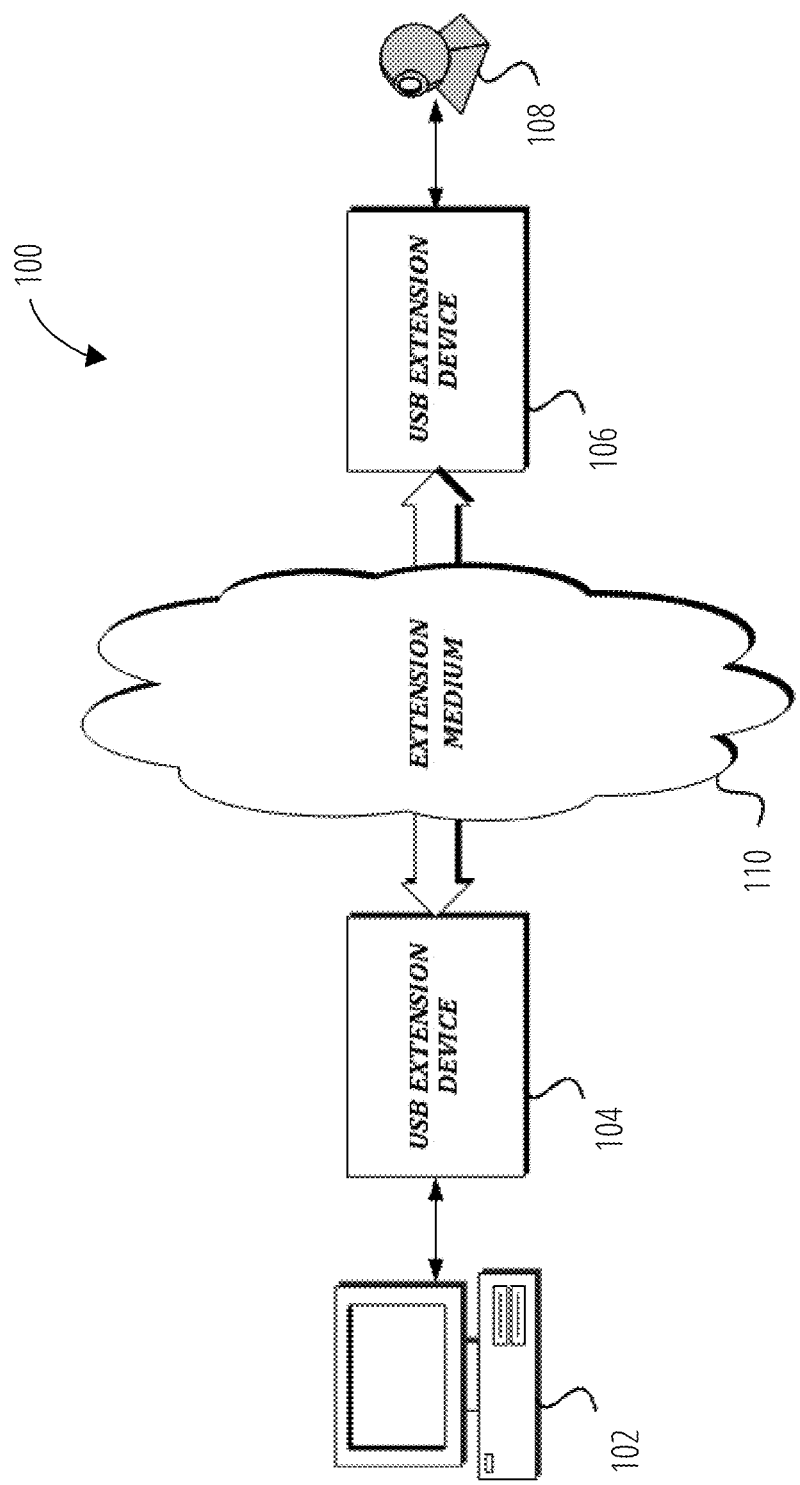
FIG. 1 is a block diagram that illustrates one embodiment of a system for extending USB communication according to various embodiments of the present disclosure.

FIG. 1 is a block diagram that illustrates one embodiment of a system 100 for extending USB communication according to various embodiments of the present disclosure. The system 100 includes a host device 102 and a USB device 108. Traditionally, the host device 102 and the USB device 108 would be directly connected via a USB cable, and would communicate directly with one another via a protocol that conforms to a USB specification, such as USB 1.0, USB 1.1, USB 2.0, USB 3.0, or USB 3.1. As discussed above, such a connection would be limited to a short distance between the host device 102 and the USB device 108 due to the timing requirements of the USB specification.

The host device 102 may be any type of computing device containing a USB host controller. Some examples of suitable host devices 102 may include, but are not limited to, a desktop computer, a laptop computer, a tablet computing device, a server computer, a set-top box, an audio head unit for an automobile, an embedded host, and/or the like. Likewise, the USB device 108 may be any type of device capable of communicating via a USB protocol with a USB host controller. The example illustrated in FIG. 1 is a webcam, but some other examples of suitable USB devices 108 may include, but are not limited to, a human interface device such as a keyboard or mouse, a mass storage device such as a flash drive or external hard drive, a USB-capable medical device, a printer, a USB hub, a wireless controller, and/or the like.

In the present system 100, the host device 102 is connected via a USB protocol to an upstream USB extension device 104, and the USB device 108 is connected via a USB protocol to a downstream USB extension device 106. The upstream USB extension device 104 and the downstream USB extension device 106 are communicatively coupled via an extension medium 110 such as a network that may increase the distance between the host device 102 and the USB device 108 beyond that supported by the USB specification. The extension medium 110 and communication thereon may include any suitable networking technology, such as Ethernet, Bluetooth, WiFi, WiMax, the Internet, fiber optic point-to-point transmission, and/or the like, and any suitable communication medium, such as via physical cables, via fiber optic cable, via wireless spectrum, and/or the like.

In some embodiments, the upstream USB extension device 104 and the downstream USB extension device 106 may happen to be closer to each other than the short USB requirement distance, and/or may be directly connected by a cable instead of via a network, but retain the capability of overcoming increased latency between the host device 102 and the USB device 108 that is introduced by the use of an extension medium 110 that does not comply with the USB specifications.

One feature provided by the upstream USB extension device 104 and downstream USB extension device 106 is that they hide the presence of the extension medium 110 from the host device 102 and the USB device 108. In other words, upstream USB extension device 104 and downstream USB extension device 106 handle communication over the extension medium 110 and compensate for any additional latency introduced thereby, but the host device 102 and the USB device 108 behave as if they were connected directly via a USB specification-compliant connection. Accordingly, the host device 102 and the USB device 108 can communicate via the upstream USB extension device 104 and downstream USB extension device 106 without any non-standard software or hardware re-configuration on the host device 102 or USB device 108.

Figure 2:
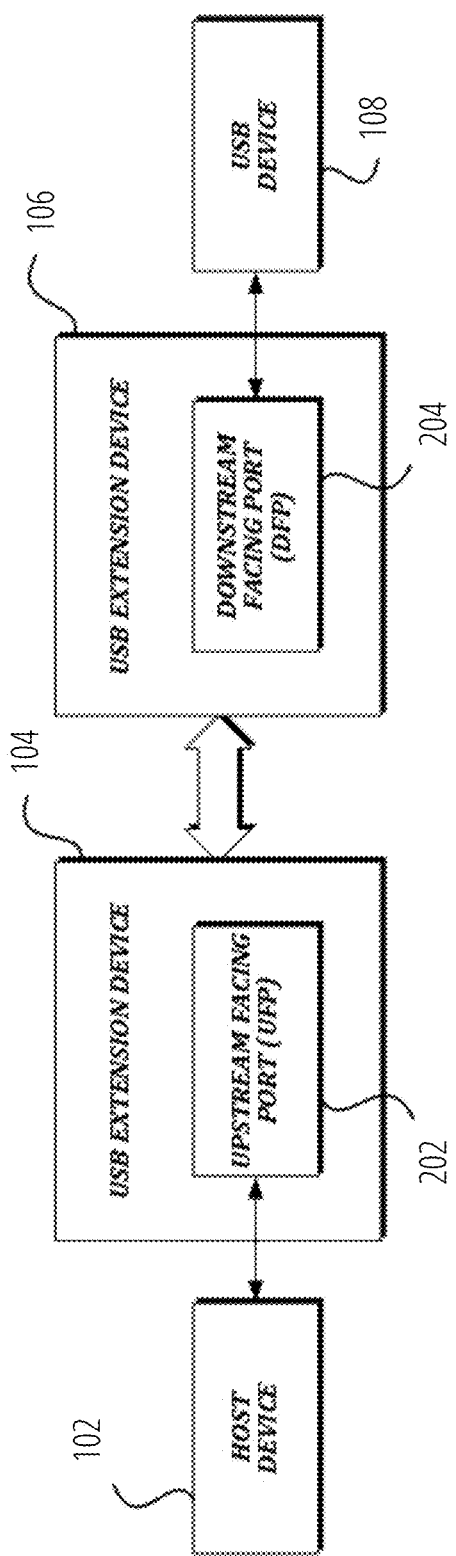
FIG. 2 is a block diagram that illustrates further details of the upstream USB extension device and downstream USB extension device illustrated in FIG. 1.

FIG. 2 is a block diagram that illustrates further details of the upstream USB extension device 104 and downstream USB extension device 106 illustrated in FIG. 1. The upstream USB extension device 104 includes an upstream facing port 202, and the downstream USB extension device 106 includes a downstream facing port 204. As used herein, the terms "upstream facing port" and the corresponding acronym "UFP" may be used interchangeably, as may the terms "downstream facing port" and the corresponding acronym "DFP." Likewise, because the upstream USB extension device 104 includes an upstream facing port 202, the upstream USB extension device 104 may also be called a "UFP device," and because the downstream USB extension device 106 includes a downstream facing port 204, the downstream USB extension device 106 may also be called a "DFP device."

The UFP device 104 is configured at least to communicate with the host device 102 via a USB-standard-compliant protocol using the upstream facing port 202, and to exchange messages and USB bus traffic with the DFP device 106 via the extension medium 110. The DFP device 106 is configured at least to communicate with the USB device 108 via a USB-standard-compliant protocol using the downstream facing port 204, and to exchange messages and USB bus traffic with the UFP device 104 via the extension medium 110. The upstream USB extension device 104 and the downstream USB extension device 106 may contain further components such as a power supply, a status LED, a loudspeaker, an input device for switching between UFP functionality and DFP functionality, and/or the like. Since such components and their functions are familiar to those of ordinary skill in the art, they have not been discussed further herein.

As illustrated in FIG. 2, the upstream facing port 202 of the upstream USB extension device 104 is connected to a downstream facing port of the host device 102, and the downstream facing port 204 of the downstream USB extension device 106 is connected to an upstream facing port of a USB device 108. In other embodiments, the upstream facing port 202 of the upstream USB extension device 104 may be connected to a downstream facing port other than one provided by a host device 102, such as a downstream facing port of a hub, and/or the like. Likewise, in other embodiments, the downstream facing port 204 of the downstream USB extension device 106 may be connected to an upstream facing port other than one provided by a USB device 108, such as an upstream facing port of a hub, and/or the like. The discussion below is primarily in terms of the simple topology illustrated in FIG. 2, but one of ordinary skill in the art will recognize that in some embodiments similar techniques may be used in other topologies without departing from the scope of the present disclosure.

Figure 3:
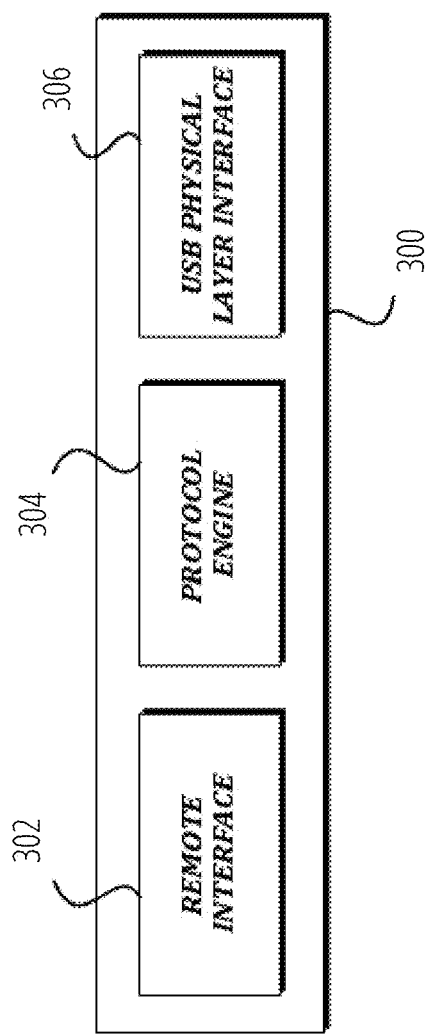
FIG. 3 is a block diagram that illustrates an exemplary embodiment of a port device according to various aspects of the present disclosure.

FIG. 3 is a block diagram that illustrates an exemplary embodiment of a port device 300 according to various aspects of the present disclosure. In some embodiments, the port device 300 may be constructed to provide services of an upstream facing port 202, and in some embodiments the port device 300 may be constructed to provide services of a downstream facing port 204. In some embodiments, the port device 300 may include instructions to provide services of both an upstream facing port 202 and a downstream facing port 204, wherein the particular port services that are provided are determined by a user configuration such as a jumper switch, a firmware setting, and/or the like.

As illustrated, the port device 300 includes a protocol engine 304, a USB physical layer interface 306, and a remote interface 302. In some embodiments, the protocol engine 304 may be configured to provide and/or execute the logic discussed below with regard to the UFP device 104 and/or the DFP device 106. The protocol engine 304 may instruct the USB physical layer interface 306 to apply the appropriate electrical signals to the USB physical layer in order to communicate with the USB device 108 or the host device 102. Likewise, the protocol engine 304 may instruct the remote interface 302 to exchange information with the remote USB extension device.

In some embodiments, the protocol engine 304 may be implemented within a logic device such as a PLD, an ASIC, a FPGA, and/or the like. In other embodiments, the protocol engine 304 may be implemented within a computing device having at least one processor and a memory containing computer-executable instructions that, if executed by the at least one processor, cause the protocol engine 304 to perform the actions discussed below; a dedicated digital hardware device implemented, for example, as a state machine configured to perform the actions described; within an application specific processor; and/or within any other suitable computing device. In some embodiments, the protocol engine 304 (or other component of the port device 300) may include a computer-readable memory usable to cache data packets, as discussed further below.

In some embodiments, logic of actions attributed to a USB extension device is executed by a protocol engine 304, which then instructs a USB physical layer interface 306 and/or a remote interface 302 to perform the appropriate communication steps associated with the logic. Throughout the discussion below, such actions may simply be described as being performed by the UFP device 104 or the DFP device 106 as if it was a single device for ease of discussion. One of ordinary skill in the art will recognize that actions attributed directly to the UFP device 104 or the DFP device 106 may actually be performed by a protocol engine 304, a USB physical layer interface 306, a remote interface 302, and/or some other component of the USB extension device.

Figure 4A:
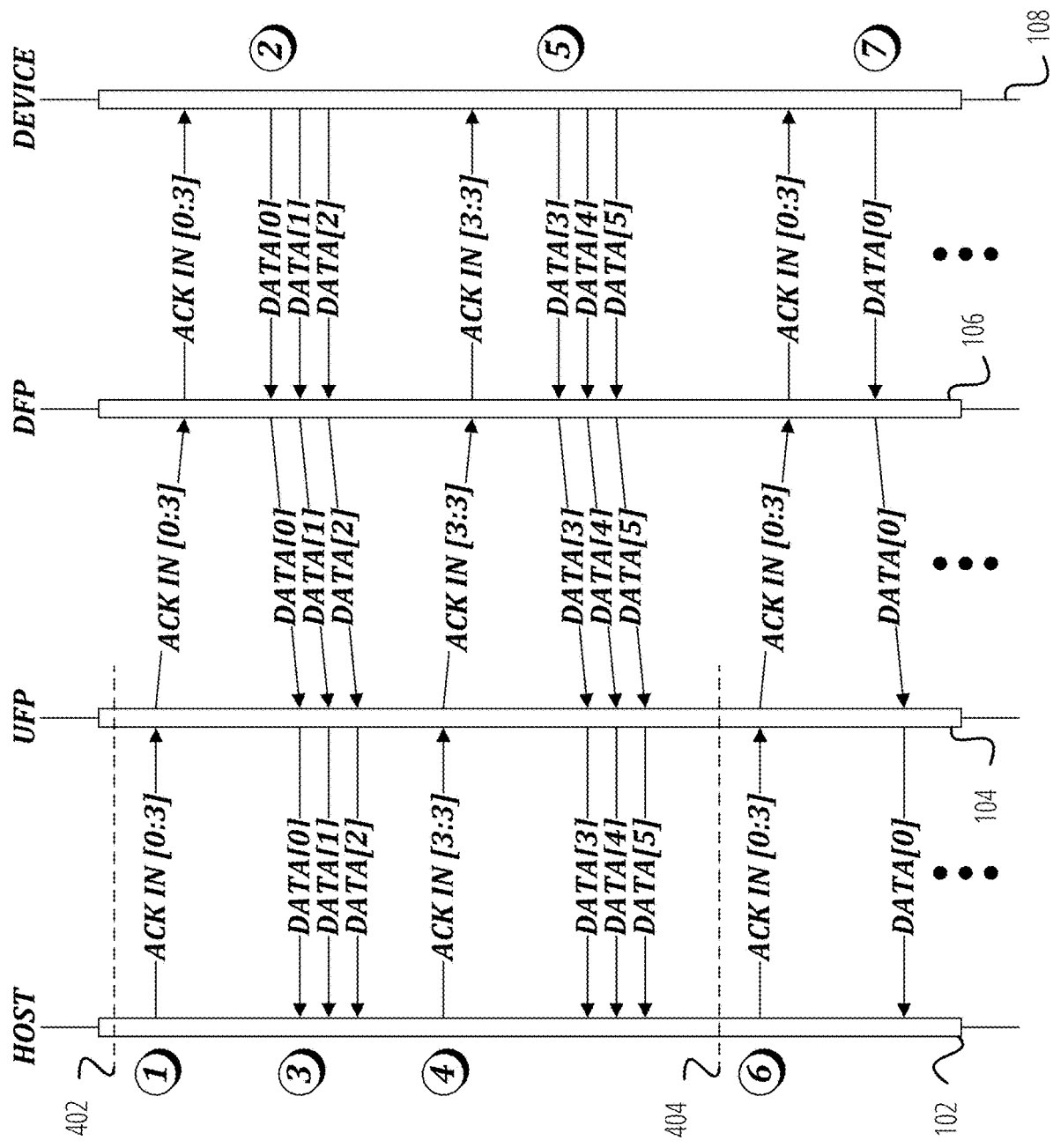
FIG. 4A is a sequence diagram that illustrates communication between a host device and a USB device in a low latency mode according to various aspects of the present disclosure.

FIG. 4A is a sequence diagram that illustrates communication between a host device 102 and a USB device 108 in a low latency mode according to various aspects of the present disclosure.

In the sequence diagram illustrated in FIG. 4A (and in the other sequence diagrams included herewith), time advances from the top of the diagram to the bottom of the diagram. Solid arrows indicate the transmission of packets generated by a host device 102 or USB device 108 according to the USB Specifications (and/or encapsulated or translated versions thereof). Dashed arrows indicate the transmission of synthetic packets generated by a UFP device 104 or a DFP device 106, either based on a packet generated by a host device 102 or USB device 108, or in response to a packet generated by a host device 102 or a USB device 108. The synthetic packets may be identical in content to the packets generated by a host device 102 or a USB device 108 but shifted in time, or may have content that is altered from the content of the packets generated by a host device 102 or a USB device 108. Horizontal arrows between separate elements indicate transmissions that comply with timing requirements of the USB Specifications, while angled arrows indicate transmissions over the extension medium 110 that may be affected by increased latency. The circled numbers refer to points in the sequence of data processing for discussion purposes.

In FIG. 4A, the illustrated communication is an isochronous IN communication, in which the host device 102 indicates that it is ready to receive data, and the USB device 108 transmits data to the host device 102. FIG. 4A illustrates the use of a UFP device 104 and a DFP device 106, in a case wherein the latency between the UFP device 104 and the DFP device 106 is low enough that the UFP device 104 and the DFP device 106 may simply convert and bridge USB physical layer signaling onto the extension medium without timing errors being introduced. In this case, the extension medium has a throughput capable of supporting a SuperSpeed connection, such as 5.0 Gbps or 10.0 Gbps. In this low latency case, the latency between the UFP device 104, the DFP device 106, and the extension medium does not impact timing parameters between the host device 102 and the USB device 108.

In SuperSpeed communication, the host device 102 schedules service intervals of, for example, 125 μs, for isochronous transactions. As described in Section 8.12.5 of the USB 3.1 Specification, the host device 102 is required to schedule transactions, including isochronous transactions, such that they do not cross these service interval boundaries. In the low-latency scenario illustrated in FIG. 4A, this may not be a problem. A first service interval boundary 402 and a second service interval boundary 404 are shown. At point 1, the host device 102 generates a request packet, such as an ACK packet, and transmits it to the UFP device 104. The ACK packet indicates a sequence number ("0") and a buffer count that indicates a number of packets that the host device 102 is ready to accept ("3"). The host device 102 may base the number of packets that it is ready to accept on a determination of whether all of the packets would be received before the next service interval boundary 404 occurs.

The UFP device 104 receives the ACK packet, and transmits it to the DFP device 106 via the extension medium. The DFP device 106 then transmits the ACK packet to the USB device 108. At point 2, the USB device 108 begins transmitting DATA packets, starting at the requested sequence number. The DATA packets are received by the DFP device 106, which forwards the DATA packets to the UFP device 104. At point 3, the UFP device 104 begins transmitting the DATA packets to the host device 102, which receives them.

At point 4, because the host device 102 is required to schedule the IN transaction such that it does not cross a service interval boundary, the host device 102 determines a number of data packets that could be received before the second service interval boundary 404 occurs. As shown, the host device 102 has determined, based on the timings specified in the USB specification, that three data packets could be requested and received before reaching the service interval boundary 404. Accordingly, the host device 102 transmits another request packet, such as an ACK packet, that indicates the next sequence number ("3") and the number of packets ("3") that it had determined could be received before the second service interval boundary 404. As before, the ACK packet is received by the UFP device 104, transmitted to the DFP device 106 over the extension medium, and then received by the USB device 108. At point 5, the USB device 108 transmits the requested data packets to the DFP device 106. The DFP device 106 transmits the requested data packets to the UFP device 104, which, in turn, transmits the requested data packets to the host device 102. After the second service interval boundary 404, the same process occurs again: at point 6, the host device 102 transmits a request packet to the USB device 108 via the UFP device 104 and the DFP device 106, and at point 7 the USB device 108 begins transmitting responsive data packets.

One will note that the transmission of two sets of three packets is an example only, and that in some embodiments, different numbers of packets may be requested. For example, Section 8.12.6.2 of the USB 3.1 Specification indicates that a host may split a transfer into bursts of 2, 4, or 8 data packets, followed by a burst of however many packets are remaining to be requested. Accordingly, in some embodiments, to request six data packets during a service interval the host device 102 may request four data packets at point 1, and then two data packets at point 4. In practice, it has been found that host devices 102 exhibit a variety of behavior.

Figure 4B:
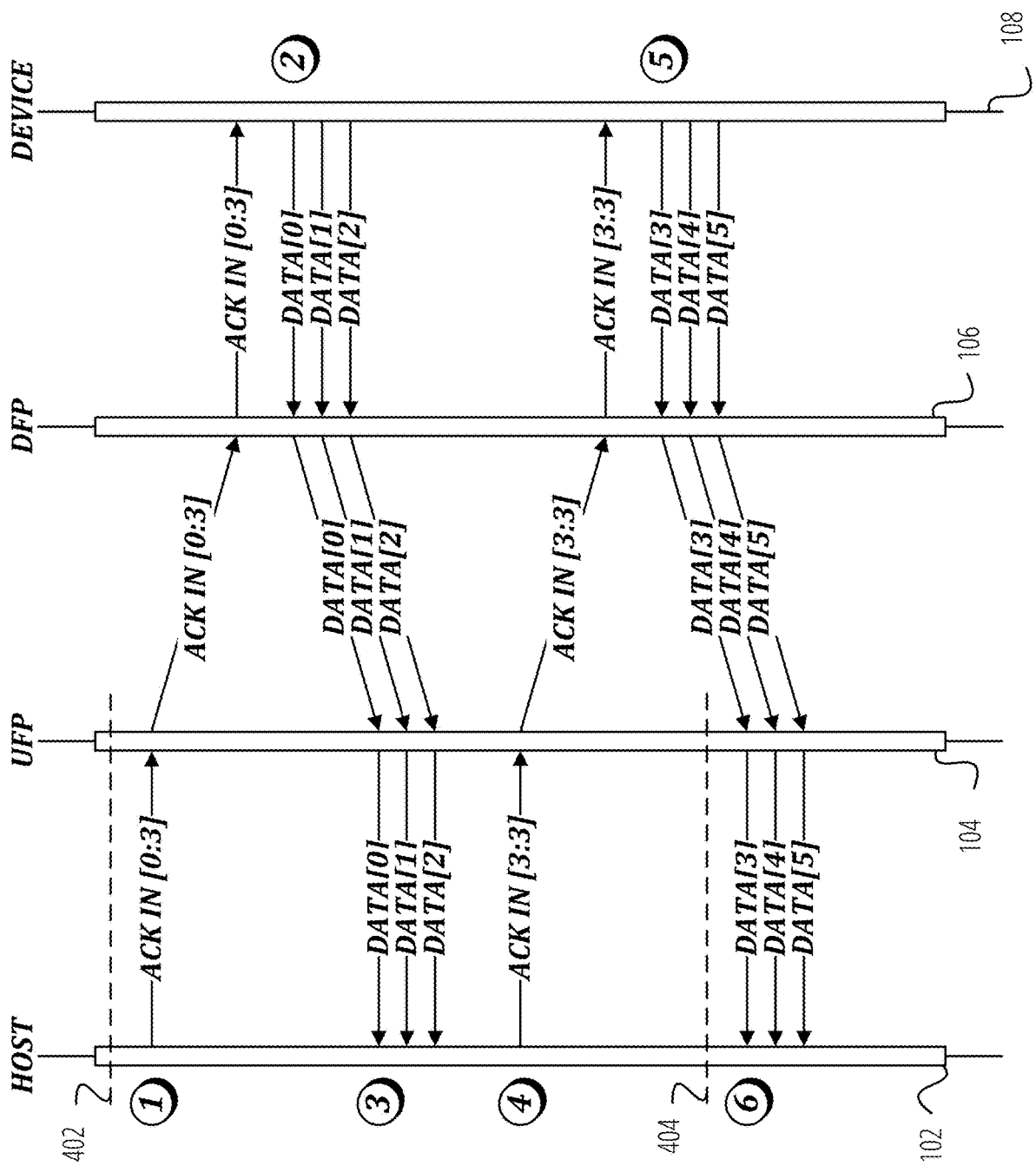
FIG. 4B is a sequence diagram that illustrates a problem in using the naïve bridging technique for isochronous IN transactions in high latency situations.

While the technique shown in FIG. 4A works in the trivial, low latency case, the inventor of the present disclosure have discovered that problems arise in high latency situations. FIG. 4B is a sequence diagram that illustrates a problem in using the naïve bridging technique for isochronous IN transactions in high latency situations. A first service interval boundary 402 and a second service interval boundary 404 are again shown. As in FIG. 4A, at point 1, the host device 102 transmits a request packet to request three data packets, which is transmitted to the USB device 108 via the UFP device 104 and the DFP device 106. At point 2, the USB device 108 begins transmitting the requested data packets back to the host device 102 via the DFP device 106 and the UFP device 104, and at point 3, the host device 102 begins receiving the data packets.

At point 4, the problems begin to become clear. As stated above, the presence of the extension medium is hidden from the host device 102, and so the host device 102 does not have the information needed to compensate for the added latency. When the host device 102 determines how many packets it can request and receive before the second service interval boundary 404 occurs, it uses the timings indicated in the USB specification to do so. Accordingly, at point 4, the host device 102 determines that, based on specification-compliant timings, it could receive three data packets before the second service interval boundary 404. So, the host device 102 transmits a request packet requesting three data packets. The request packet is transmitted to the USB device 108 via the UFP device 104 and the DFP device 106, and at point 5, the USB device 108 begins transmitting the requested data packets to the host device 102 via the DFP device 106 and the UFP device 104. Due to the added latency introduced by the extension medium, the host device 102 does not start receiving the data packets until point 6, which is after the second service interval boundary 404 has already occurred. This will cause errors in the communication between the host device 102 and the USB device 108. In some cases, these errors may manifest as the connection between the host device 102 and the USB device 108 being dropped. In some cases, the connection may not be dropped, but the errors may manifest in other ways, such as a video image provided by a camera including flicker or other unwanted artifacts.

Figure 5:
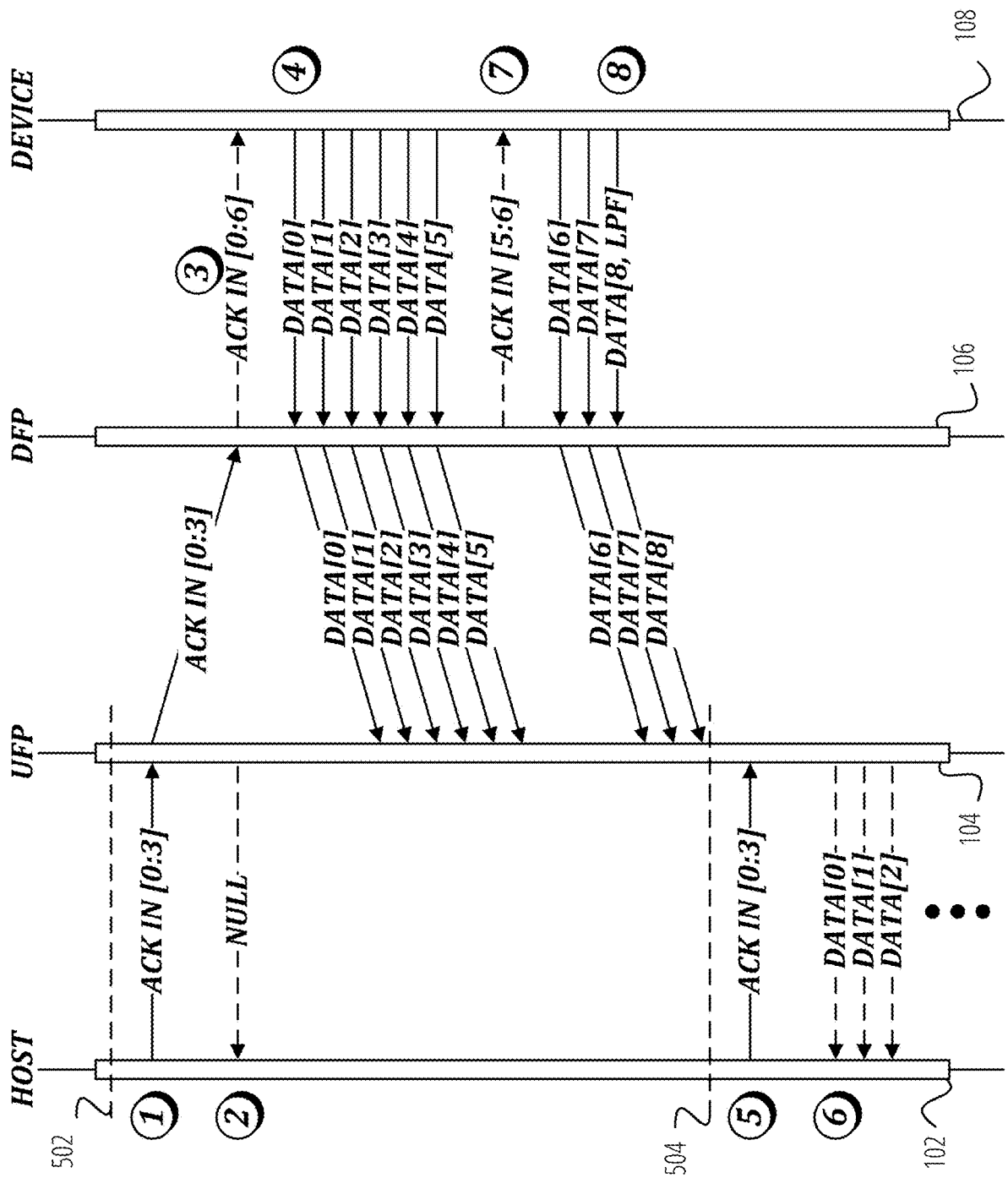
FIG. 5 is a sequence diagram that illustrates an example of a technique for compensating for latency added by the extension medium in isochronous IN transactions according to various aspects of the present disclosure.

FIG. 5 is a sequence diagram that illustrates an example of a technique for compensating for latency added by the extension medium in isochronous IN transactions according to various aspects of the present disclosure. Like in FIG. 4A and FIG. 4B, a first service interval boundary 502 and a second service interval boundary 504 are illustrated. At point 1, the host device 102 sends a request packet to the UFP device 104 that includes a sequence number ("0") and a number of packets ("3"), and the UFP device 104 transmits the request packet to the DFP device 106. At point 2, the UFP device 104 transmits a synthetic packet back to the host device 102 to place the host device 102 in a temporary waiting state. The illustrated synthetic packet is a null (NULL) packet, which may be a data packet with a zero-length payload, but any other type of packet that can place the host device 102 in a waiting state may be used. In response to receiving the NULL packet, the host device 102 enters a waiting state in which it does not re-transmit the request packet until after the second service interval boundary 504.

At point 3, the DFP device 106 sends a synthetic request packet to the USB device 108. The synthetic request packet created by the DFP device 106 includes the sequence number from the request packet transmitted by the host device 102 at point 1. However, the DFP device 106 has altered the number of packets such that it does not match the number of packets in the request packet transmitted by the host device 102 at point 1.

In some embodiments, the DFP device 106 may request a greater number of packets than were requested by the host device 102. Requesting a greater number of packets allows the DFP device 106 to receive additional data that can be sent to the UFP device 104 to respond to subsequent requests from the host device 102 without having to wait for a round-trip communication between the UFP device 104 and the DFP device 106. In some embodiments, the DFP device 106 may determine a number of packets associated with a maximum burst size value that has been configured by the host device 102 for the USB topology or for the particular USB device 108 during the initial enumeration conducted by the host device 102. The DFP device 106 may request a number of packets to correspond to the maximum burst size, regardless of whether the host device 102 requested fewer packets in its first request. This may ensure that the UFP device 104 will have all of the data that the host device 102 would request during a single service interval. A maximum number of packets that may be processed by a host device 102 during a service interval may be up to 48 for 5 Gbps communication or 96 for 10 Gbps communication. USB devices 108 are normally configured with maximum burst size values lower than these limits. A typical maximum burst size may be around 6 or 7, though values as low as 3 may be possible, as well as values as high as 12 for devices including but not limited to some high-definition cameras, or even higher for other devices.

In other embodiments, the DFP device 106 may request any number of packets that is between the number of packets requested by the host device 102 and the maximum burst size. As illustrated, the DFP device 106 has generated a synthetic packet to request six packets, instead of the three originally requested by the host device 102. This may be because the maximum burst size has been configured to be six, or for other reasons including but not limited to a configuration on the DFP device 106, a determination based on the number of packets from the original request packet, or a determination based on the amount of latency between the UFP device 104 and the DFP device 106.

At point 4, the USB device 108 transmits the requested data packets to the DFP device 106. The DFP device 106 then transmits the requested data packets to the UFP device 104. At point 5, the host device 102 determines that the second service interval boundary 504 has occurred, and so the host device 102 transmits a new request packet that may be similar to the request packet transmitted at point 1. At point 6, the UFP device 104 responds with the three data packets that had been cached on the UFP device 104. These data packets are illustrated with dashed lines and may be considered synthetic data packets because they are shifted in time by virtue of being cached by the UFP device 104.

One will recognize that the host device 102 may then transmit another request packet to request the next three data packets, and the UFP device 104 may respond with the next three data packets that had also been cached on the UFP device 104. One will note that, by pre-fetching more data than requested by the host device 102, the UFP device 104 is able to replicate the functionality described between points 1-5 of FIG. 4A, wherein a maximum amount of data can be transferred during a single service interval, even though the situation in FIG. 5 includes a high amount of latency between the UFP device 104 and the DFP device 106.

FIG. 5 also illustrates that the DFP device 106 may retrieve as many data packets as possible from the USB device 108 during a given service interval. The data packets transmitted at point 4 from the USB device 108 to the DFP device 106 included all of the data packets requested, but did not include a data packet with a last packet flag (LFP) set. According to the USB Specifications, this indicates to the DFP device 106 that the USB device 108 has additional data packets to transmit. Accordingly, at point 7, the DFP device 106 transmits an additional synthetic packet to request a subsequent group of packets from the USB device 108, and the USB device 108 responds with data packets responsive to the request. At point 8, the USB device 108 transmits a data packet with the LPF set. Accordingly, the DFP device 106 understands that the USB device 108 has transmitted all of its data, and therefore does not transmit an additional synthetic packet to request further data packets until a new request packet is received from the UFP device 104.

One will note that some aspects of the technique illustrated in FIG. 5 are similar to techniques disclosed in U.S. Pat. No. 10,552,355, issued Feb. 4, 2020 (hereinafter "the '355 Patent"). However, the techniques illustrated in FIG. 5 are nevertheless distinguishable. For example, instead of having the synthetic packet generated by the UFP device 104 as disclosed in the '355 Patent, the present disclosure describes the synthetic packet being generated by the DFP device 106. It has been found that allowing the DFP device 106 instead of the UFP device 104 to control the number of data packets requested from the USB device 108 allows for improved communication at least because the DFP device 106 is able to obtain more timely status information from the USB device 108 due to its USB standard-compliant connection thereto.

Figure 6:
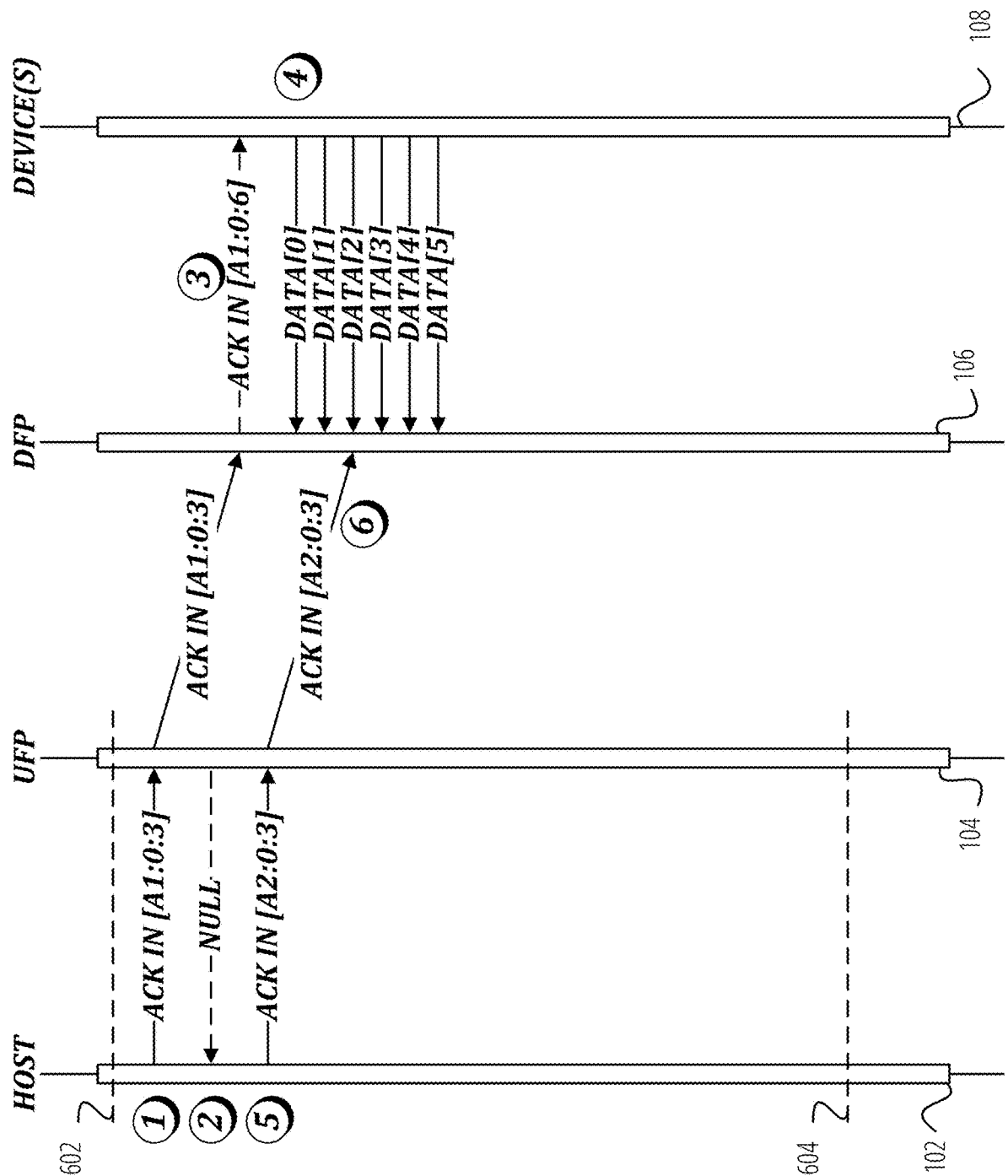
FIG. 6 is a sequence diagram that illustrates a problem in using the technique of FIG. 5 to overcome latency issues in an extension environment with multiple concurrently active USB endpoints.

While the techniques disclosed in FIG. 5 are useful in communication topologies having a single active USB endpoint, it has been found by the inventor of the present application that additional problems may arise if more than one USB endpoint is concurrently active. FIG. 6 is a sequence diagram that illustrates a problem in using the technique of FIG. 5 to overcome latency issues in an extension environment with multiple concurrently active USB ISO IN endpoints.

In FIG. 6, a host device 102, UFP device 104, and DFP device 106 are illustrated similar to those illustrated and discussed above. The USB device 108 illustrated in FIG. 6 may represent multiple USB devices 108 with concurrent active endpoints, or may represent a single USB device 108 with multiple concurrent active endpoints.

A service interval starts at first service interval boundary 602, and at point 1, the host device 102 generates a request packet, such as an ACK packet, and transmits it to the UFP device 104. The UFP device 104, in turn, transmits the request packet to the DFP device 106. The ACK packet indicates a target endpoint ("A1"), a sequence number ("0"), and a number of packets that the host device 102 is ready to accept ("3"). As discussed above, at point 2, the UFP device 104 responds to the host device 102 with a synthetic NULL packet. At point 3, the DFP device 106 generates a synthetic request packet to request a greater number of packets from the USB device 108, and at point 4, the USB device 108 begins transmitting the requested packets to the DFP device 106.

At point 5, problems start to be introduced. In the single endpoint scenario illustrated in FIG. 5, the host device 102 would wait until after the second service interval boundary 604 to submit another request packet to the single endpoint. However, with more than one concurrent active endpoint, once the host device 102 receives the NULL packet in response to the first request packet, the host device 102 may determine whether it could issue another request to a different endpoint that could be fulfilled before the second service interval boundary 604. Accordingly, at point 5, the host device 102 generates a second request packet, such as the illustrated ACK packet directed to endpoint "A2," and transmits it to the UFP device 104. Endpoint A2 may be a different endpoint provided by the USB device 108 that provides endpoint A1, or may be an endpoint provided by a different USB device 108. One will recognize that the particular endpoint identifiers "A1" and "A2" are used as non-limiting examples only, and that in some embodiments, different or additional endpoint identifiers may be used.

At point 6, the DFP device 106 receives the second request packet from the UFP device 104. However, at point 6, the DFP device 106 is busy receiving the response packets from the A1 endpoint, and the receipt of the second request packet conflicts with the servicing of these packets. What is desired are techniques to address these conflicts to allow multiple concurrent endpoints to operate in an extension environment.

Further, naïve handling of requests to concurrent endpoints in a first-come, first-serve manner may produce suboptimal results. For example, each endpoint may be configured with a bInterval value which indicates a frequency at which the host device 102 is expected to transmit requests for data packets to the endpoint. Endpoints configured with a smaller bInterval value are expected to be more responsive than endpoints with a larger bInterval value. However, if endpoints with a smaller bInterval value are required to wait for completion of a transaction for an endpoint with a larger bInterval value, the desired levels of responsiveness may not be achieved. What is desired are techniques to allow interleaving of transactions for endpoints of differing bInterval values in order to provide improved responsiveness.

Figure 7A:
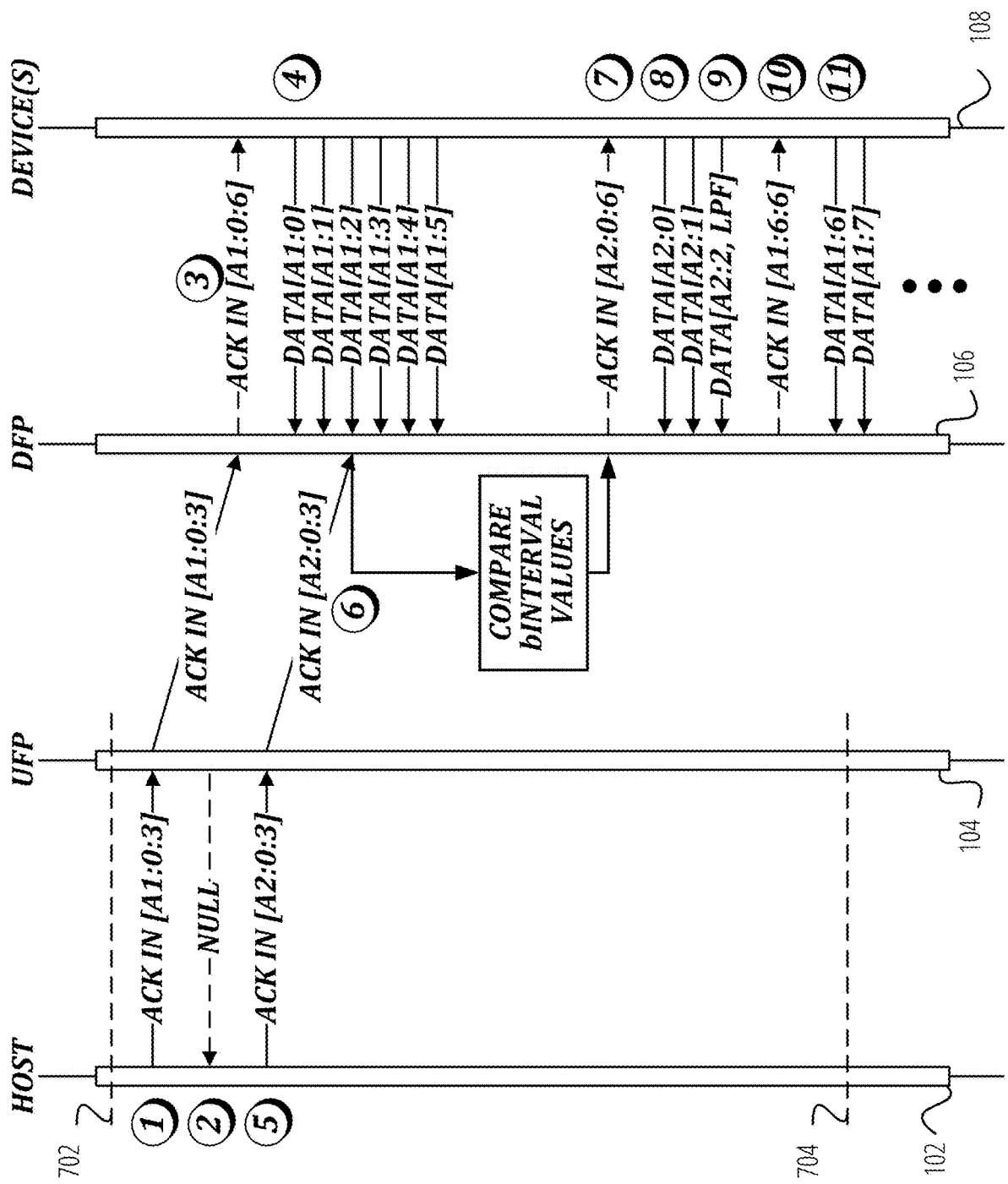
FIG. 7A and FIG. 7B are sequence diagrams that illustrate examples of a technique for compensating for latency added by the extension medium in isochronous IN transactions according to various aspects of the present disclosure.

FIG. 7A is a sequence diagram that illustrates an example of a technique for compensating for latency added by the extension medium in isochronous IN transactions according to various aspects of the present disclosure. In FIG. 7A, a host device 102, UFP device 104, and DFP device 106 are illustrated similar to those illustrated and discussed above. The USB device 108 illustrated in FIG. 7A may represent multiple USB devices 108 with concurrent active endpoints, or may represent a single USB device 108 with multiple concurrent active endpoints.

A service interval starts at first service interval boundary 702 and ends at a second service interval boundary 704. At point 1, the host device 102 generates a request packet, such as an ACK IN packet, and transmits it to the UFP device 104. The UFP device 104, in turn, transmits the request packet to the DFP device 106. The ACK packet indicates a target endpoint ("A1"), a sequence number ("0"), and a number of packets that the host device 102 is ready to accept ("3"). As discussed above, at point 2, the UFP device 104 responds to the host device 102 with a synthetic NULL packet. At point 3, the DFP device 106 generates a synthetic request packet to request a greater number of packets from the USB device 108, and at point 4, the USB device 108 begins transmitting the requested packets to the DFP device 106. In some embodiments, the synthetic request packet may request a smaller number of packets than the request packet transmitted by the host device 102, or the same number of packets.

At point 5, the host device 102 generates a second request packet, such as the illustrated ACK packet directed to endpoint "A2," and transmits it to the UFP device 104. Endpoint A2 may be a different endpoint provided by the USB device 108 that provides endpoint A1, or may be an endpoint provided by a different USB device 108. One will recognize that the particular endpoint identifiers "A1" and "A2" are used as non-limiting examples only, and that in some embodiments, different or additional endpoint identifiers may be used.

At point 6, the DFP device 106 receives the second request packet from the UFP device 104. Upon receiving the second request packet, the DFP device 106 determines whether the USB bus is available for transmitting a synthetic request packet based on the second request packet. Because endpoint A1 is transmitting data on the USB bus, the USB bus is not available at point 6. Accordingly, the DFP device 106 stores the second request packet until it detects that the USB bus is available.

Eventually, the DFP device 106 detects that the USB bus is available. In the illustrated embodiment, the DFP device 106 detects that the USB bus is available when the DFP device 106 detects that the requested number of data packets have been received. In other embodiments (such as the embodiment illustrated in FIG. 7B), the DFP device 106 may detect that the USB bus is available when a data packet with the LPF value set is received.

Once the USB bus is determined to be available, the DFP device 106 has two endpoints to which a synthetic request packet could be sent: a subsequent synthetic request packet could be sent to endpoint A1 (as illustrated at point 7 in FIG. 5), or a new synthetic request packet could be sent to endpoint A2 based on the request packet received at point 6 in the present FIG. 7A. In some embodiments, in order to determine the endpoint which should be serviced, the DFP device 106 compares the bInterval value for the first endpoint (endpoint A1) to the bInterval value for the second endpoint (endpoint A2). By choosing the endpoint with a smaller bInterval value, the DFP device 106 can provide better responsiveness for the chosen endpoint, and thereby provide a more stable and effective extension environment.

In the illustrated embodiment, the comparison of the bInterval values determined that the bInterval value for endpoint A2 is smaller than the bInterval value for endpoint A1. Accordingly, at point 7, the DFP device 106 transmits a synthetic request packet to the second endpoint (endpoint A2). One will recognize that if the bInterval value for endpoint A2 was not smaller than the bInterval value for endpoint A1, then the DFP device 106 may instead have transmitted a subsequent synthetic request packet to endpoint A1 (as illustrated at point 7 in FIG. 5), saving the request packet for endpoint A2 received at point 6 until processing of the transfer from endpoint A1 is complete. At point 8, endpoint A2 begins transmitting data packets responsive to the synthetic request packet transmitted at point 7. Though not illustrated, the DFP device 106 transmits the data packets to the UFP device 104, such that the UFP device 104 may cache the data packets for later transmission to the host device 102.

In some embodiments, endpoint A2 may continue to transmit data packets until endpoint A2 does not have any further data packets to transmit, as illustrated for the single endpoint in FIG. 5. Likewise, if the first batch does not include all of the data packets that endpoint A2 has to transmit, the DFP device 106 may transmit a subsequent synthetic request packet to endpoint A2. In the illustrated embodiment, however, endpoint A2 only has three data packets to transmit. Accordingly, at point 9, endpoint A2 transmits a data packet with the LPF value set.

Upon receiving the data packet with the LPF value set, the DFP device 106 determines that the USB bus is free for communication with a different endpoint. Since the subsequent request packet to endpoint A1 had been paused in order to service endpoint A2, at point 10 the DFP device 106 returns to the paused packet, and transmits the subsequent synthetic request packet to endpoint A1, and at point 11 begins to receive responsive data packets from endpoint A1. The DFP device 106 then continues to process the transaction with endpoint A1, which is not illustrated for the sake of brevity.

Though communication with only two endpoints (endpoint A1 and endpoint A2) is described, one will recognize that in some embodiments, request packets directed toward additional endpoints may also be paused at the DFP device 106 while the USB bus is busy, and the bInterval values for all of the paused request packets may be compared to determine which to service first.

Figure 7B:
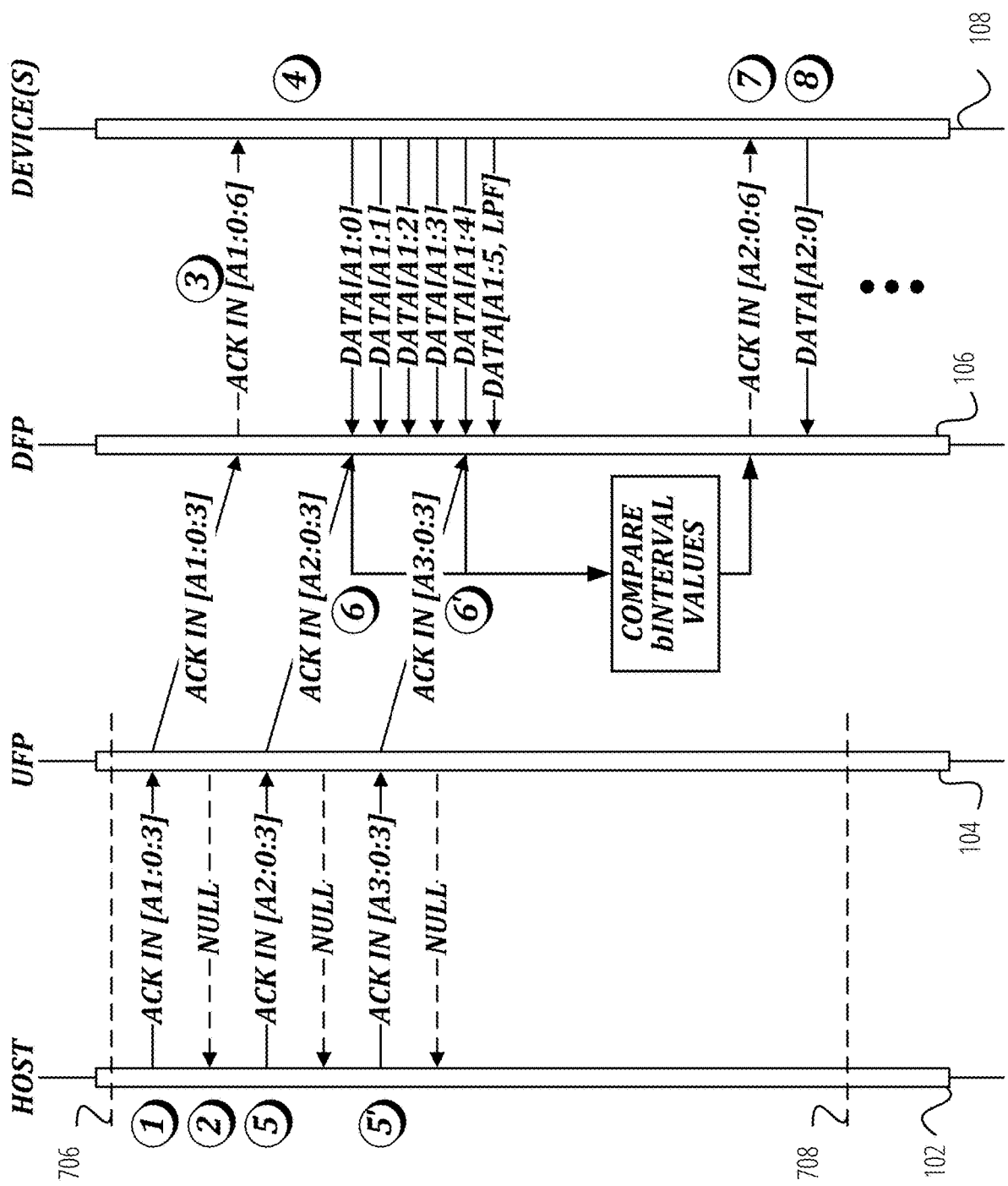

FIG. 7B is another sequence diagram that illustrates an additional aspect of the technique for compensating for latency illustrated in FIG. 7B. In FIG. 7B, a host device 102, UFP device 104, and DFP device 106 are illustrated similar to those illustrated and discussed above. The USB device 108 illustrated in FIG. 7B may represent multiple USB devices 108 with concurrent active endpoints, or may represent a single USB device 108 with multiple concurrent active endpoints.

A service interval starts at first service interval boundary 706 and ends at a second service interval boundary 708. From point 1 to point 6, the operation of the sequence illustrated in FIG. 7B is the same as the operation of the sequence illustrated in FIG. 7A, and so is not discussed again here. The difference, however, is that instead of two active endpoints, FIG. 7B illustrates three concurrently active endpoints (endpoint A1, A2, and A3). Accordingly, upon receiving the second synthetic null packet from the UFP device 104, at point 5', the host device 102 transmits a third request packet addressed to the third endpoint (endpoint A3), which is received by the DFP device 106 at point 6'.

Upon receiving the third request packet, the DFP device 106 again determines whether the USB bus is available for transmitting a synthetic request packet based on the second request packet or the third request packet. Because endpoint A1 is transmitting data on the USB bus, the USB bus is not available at point 6' either. Accordingly, the DFP device 106 stores the third request packet until it detects that the USB bus is available.

Eventually, the DFP device 106 detects that the USB bus is available. In the illustrated embodiment, the DFP device 106 detects that the USB bus is available when a data packet with the LPF value set is received.

Once the USB bus is determined to be available, the DFP device 106 has two endpoints to which a synthetic request packet could be sent: a synthetic request packet could be sent to endpoint A2 based on the request packet received at point 6, or a synthetic request packet could be sent to endpoint A3 based on the request packet received at point 6'. In some embodiments, in order to determine the endpoint which should be serviced, the DFP device 106 compares the bInterval value for the second endpoint (endpoint A2) to the bInterval value for the third endpoint (endpoint A3). By choosing the endpoint with a smaller bInterval value, the DFP device 106 can provide better responsiveness for the chosen endpoint, and thereby provide a more stable and effective extension environment.

In the illustrated embodiment, the comparison of the bInterval values determined that the bInterval value for endpoint A2 is smaller than the bInterval value for endpoint A3. Accordingly, at point 7, the DFP device 106 transmits a synthetic request packet to the second endpoint (endpoint A2). One will recognize that if the bInterval value for endpoint A2 was not smaller than the bInterval value for endpoint A3, then the DFP device 106 may instead have transmitted a synthetic request packet to endpoint A3. At point 8, endpoint A2 begins transmitting data packets responsive to the synthetic request packet transmitted at point 7, and the rest of the processing continues similar to that illustrated in FIG. 7A.

The illustrations in FIG. 7A—FIG. 7B and the related discussion assumes that all of the illustrated and described communication between the DFP device 106 and the endpoints takes place within a single bus interval, since the USB Specifications require the request packet and the responsive data packets to be exchanged within a single bus interval. To that end, the DFP device 106 may adjust the number of packets requested in the synthetic request packets to ensure that the response packets can be received during the same bus interval. However, given the tight timing requirements for communication that complies with the USB Specifications, it is possible that differences in the USB communication topology may change this number of packets depending on the endpoint.

Figure 8:
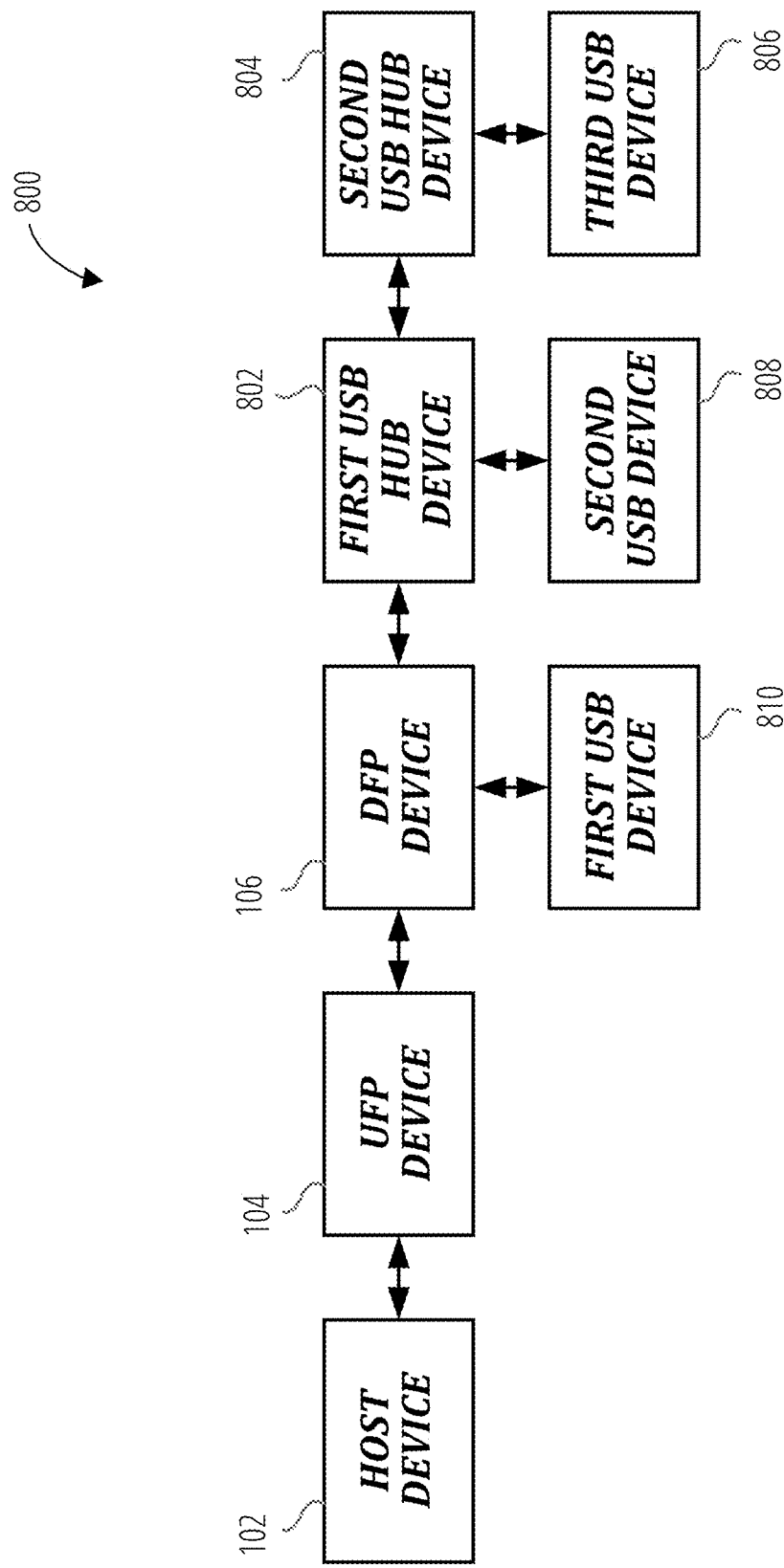
FIG. 8 is a schematic drawing that illustrates an example USB communication topology within an extension environment according to various aspects of the present disclosure.

FIG. 8 is a schematic drawing that illustrates an example USB communication topology within an extension environment according to various aspects of the present disclosure. As shown, the host device 102, UFP device 104, and DFP device 106 are connected as illustrated in FIG. 1, and the first USB device 810 is coupled to the USB downstream facing port of the DFP device 106 (as is the USB device 108 illustrated above). The topology 800 is more complex than the topology of FIG. 1, in that the USB downstream facing port of the DFP device 106 is also coupled to an upstream facing port of a first USB hub device 802, and a second USB device 808 is coupled to a downstream facing port of the first USB hub device 802. Further, an upstream facing port of a second USB hub device 804 is coupled to a downstream facing port of the first USB hub device 802, and a third USB device 806 is coupled to a downstream facing port of the second USB hub device 804. All communication from the downstream facing port(s) of the DFP device 106 is compliant with the USB Specifications, and appears to the host device 102 as if the first USB device 810, the first USB hub device 802, the second USB device 808, the second USB hub device 804, and the third USB device 806 are coupled directly to the host device 102.

In the topology 800, bus interval boundaries generated by the DFP device 106 control timing of communication with the first USB device 810, the second USB device 808, and the third USB device 806. As such, even for the third USB device 806 (which is separated from the DFP device 106 by the first USB hub device 802 and the second USB hub device 804), response packets must be received during the same bus interval as the corresponding request packet. Since the first USB device 810, the second USB device 808, and the third USB device 806 are separated from the DFP device 106 by different distances, the number of packets that may be requested before the end of a given bus interval may be different due to different amounts of latency in the communication.

Figure 9:
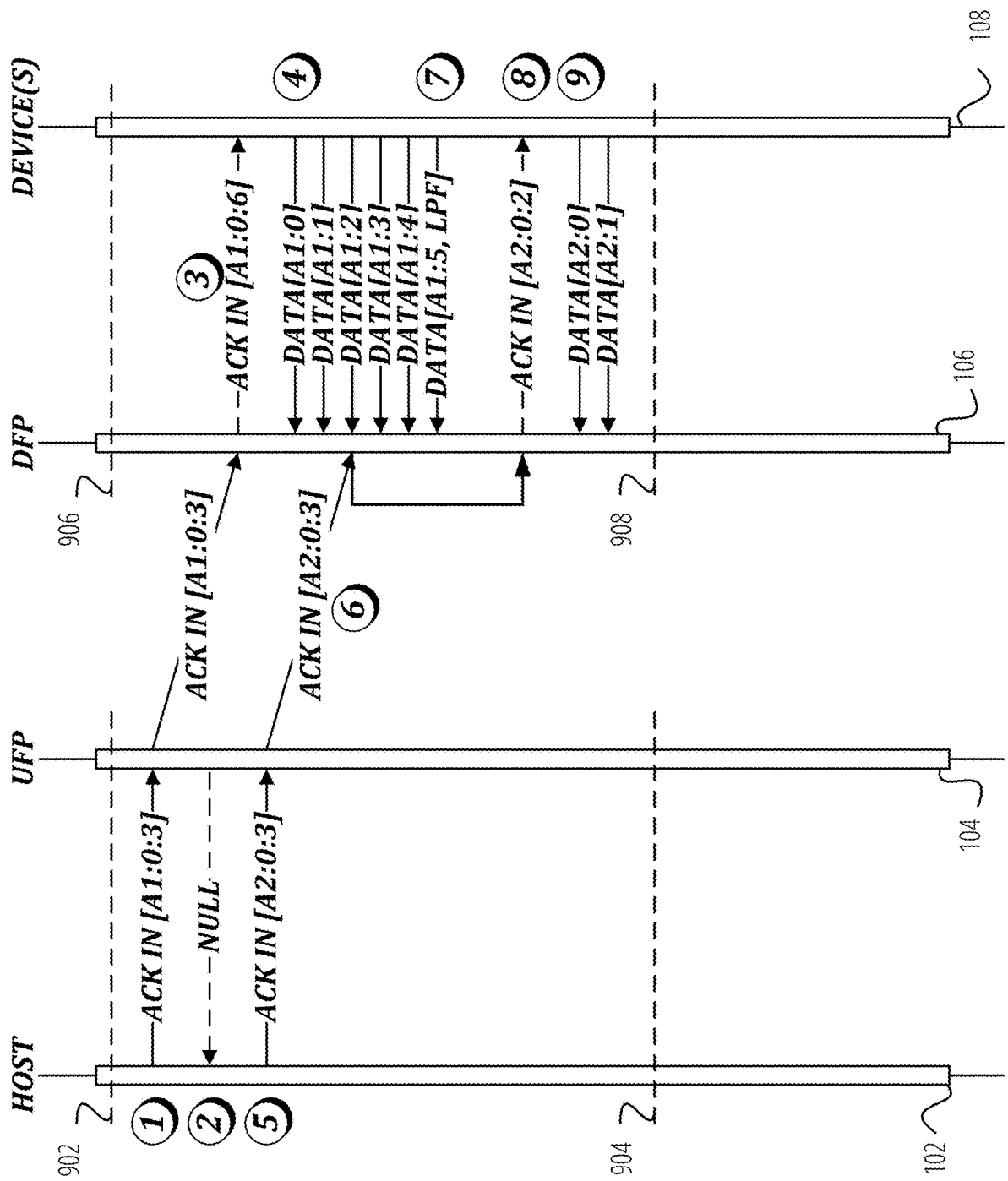
FIG. 9 is a sequence diagram that illustrates a non-limiting example embodiment of a technique for compensating for varying amounts of latency when transmitting synthetic request packets according to various aspects of the present disclosure.

FIG. 9 is a sequence diagram that illustrates a non-limiting example embodiment of a technique for compensating for varying amounts of latency when transmitting synthetic request packets according to various aspects of the present disclosure.

In FIG. 9, a host device 102, UFP device 104, and DFP device 106 are illustrated similar to those illustrated and discussed above. The USB device 108 illustrated in FIG. 9 may represent multiple USB devices 108 with concurrent active endpoints. Further, the multiple USB devices 108 may be separated from the DFP device 106 by varying depths of intervening USB hubs, as illustrated in FIG. 8. FIG. 9 also illustrates a host bus interval between a first host bus interval boundary 902 and a second host bus interval boundary 904 generated by the host device 102, and an extension bus interval between a first extension bus interval boundary 906 and a second extension bus interval boundary 908 generated by the DFP device 106. Transactions between the host device 102 and UFP device 104 are completed within the host bus interval, and transactions between the DFP device 106 and the USB device 108 are completed within the extension bus interval, according to the USB Specifications. Though the first host bus interval boundary 902 and the first extension bus interval boundary 906 are illustrated as being generated at the same time for the sake of convenience, and the second host bus interval boundary 904 and the second extension bus interval boundary 908 are illustrated as being generated at the same time for the sake of convenience, in some embodiments, the bus interval boundaries generated between the DFP device 106 and the USB device 108 may be delayed by an amount to compensate for the latency in communication between the UFP device 104 and the DFP device 106.

At point 1, the host device 102 generates a request packet, such as an ACK IN packet, and transmits it to the UFP device 104. The UFP device 104, in turn, transmits the request packet to the DFP device 106. At point 2, the UFP device 104 responds to the host device 102 with a synthetic NULL packet. At point 3, the DFP device 106 generates a synthetic request packet directed to endpoint A1, and at point 4, the USB device 108 associated with endpoint A1 begins transmitting the requested packets to the DFP device 106. At point 5, the host device 102 generates a second request packet, such as the illustrated ACK packet directed to endpoint "A2," and transmits it to the UFP device 104, and at point 6, the DFP device 106 receives the second request packet from the UFP device 104. The actions from point 1 through point 6 are similar to those discussed above in FIG. 7A, and so are not discussed again in detail here for the sake of brevity.

At point 7, endpoint A1 transmits a data packet with the LPF value set, indicating that endpoint A1 does not have any more data to send, and that the DFP device 106 may use the USB bus to transmit a request packet to a different endpoint. Accordingly, at point 8, the DFP device 106 transmits a synthetic request packet to endpoint A2. This is similar to the synthetic request packet transmitted at point 7 in FIG. 7A, though because no other request is waiting to be processed, the DFP device 106 can transmit the packet to endpoint A2 without comparing bInterval values.

In some embodiments, before creating the synthetic request packet at point 8, the DFP device 106 determines a predicted amount of latency in the communication between the DFP device 106 and the target endpoint. Because the communication downstream of the DFP device 106 is compliant with the USB Specifications, the predicted amount of latency may be determined by counting a hub depth, or a number of USB hubs, between the DFP device 106 and the USB device 108 associated with the target endpoint.

For example, in FIG. 8, if the target endpoint is associated with the first USB device 810, then the hub depth would be zero because the first USB device 810 is coupled directly to the DFP device 106, and no additional latency would be considered. If the target endpoint were associated with the second USB device 808, then the hub depth would be one because the second USB device 808 is coupled to the DFP device 106 via the first USB hub device 802, and a corresponding amount of predicted latency would be used. Likewise, if the target endpoint were associated with the third USB device 806, then the hub depth would be two because the third USB device 806 is coupled to the DFP device 106 via the first USB hub device 802 and the second USB hub device 804, and a corresponding increased amount of predicted latency would be used. In some embodiments, a predetermined amount of latency may be predicted for each level of hub depth. For example, a predetermined amount of latency in a range of 0.65 µs to 0.75 µs, such as 0.7 µs, may be used as the predicted amount of latency for each level of hub depth. In some embodiments, the DFP device 106 may measure an amount of latency at each hub depth level, and may use the measured amount of latency in its prediction.

As illustrated in FIG. 9, the predicted latency in communication with endpoint A2 indicates that there is only time to communicate two data packets before the second extension bus interval boundary 908 occurs. Accordingly, the synthetic request packet transmitted at point 8 only requests two packets, which are then returned by the USB device 108 associated with endpoint A2 at point 9. The extension bus interval then ends at the second extension bus interval boundary 908.

While illustrative embodiments have been illustrated and described, it will be appreciated that various changes can be made therein without departing from the spirit and scope of the disclosure.

The embodiments of the invention in which an exclusive property or privilege is claimed are defined as follows:

1. A system for communicating USB information via a non-USB extension medium, the system comprising: a downstream facing port device (DFP device) configured to: receive, via the non-USB extension medium, an acknowledge (ACK) IN packet addressed to a first endpoint while receiving DATA packets from a second endpoint, wherein the ACK IN packet addressed to the first endpoint includes a sequence number and a buffer count; detect an end of transmission of the DATA packets from the second endpoint; determine a number of packets that can be received from the first endpoint during a remaining amount of time in a current bus interval; and transmit at least one synthetic ACK IN packet to the first endpoint based on the number of packets, wherein each synthetic ACK IN packet includes a sequence number and a buffer count.

2. The system of claim 1, wherein determining the number of packets that can be received from the first endpoint during the remaining amount of time in the current bus interval includes:
   estimating an amount of latency based on a hub depth between the DFP device and a USB device associated with the first endpoint.

3. The system of claim 1, wherein transmitting at least one synthetic ACK IN packet to the first endpoint based on the number of packets includes determining the buffer count for each synthetic ACK IN packet based on the number of packets.

4. The system of claim 3, wherein the number of packets that can be received from the first endpoint during the remaining amount of time in the current bus interval is smaller than the buffer count in the ACK IN packet addressed to the first endpoint, and wherein the buffer count for at least one synthetic ACK IN packet is smaller than the buffer count in the ACK IN packet addressed to the first endpoint.

5. The system of claim 3, wherein the number of packets that can be received from the first endpoint during the remaining amount of time in the current bus interval is larger than the buffer count in the ACK IN packet addressed to the first endpoint, and wherein the buffer count for at least one synthetic ACK IN packet is larger than the buffer count in the ACK IN packet addressed to the first endpoint.

6. The system of claim 1, wherein detecting the end of transmission of the DATA packets from the second endpoint includes at least one of:
   detecting receipt of a total number of DATA packets requested by a previous ACK IN packet transmitted by the DFP device to the second endpoint; and
   detecting receipt of a DATA packet from the second endpoint with a last packet flag (LPF) set.

7. A method of enabling communication between a host device and at least one USB device via a non-USB extension medium, the method comprising: receiving, by a downstream facing port device (DFP device) via the non-USB extension medium, an acknowledge (ACK) IN packet addressed to a first endpoint while receiving DATA packets from a second endpoint, wherein the ACK IN packet addressed to the first endpoint includes a sequence number and a buffer count; detecting, by the DFP device, an end of transmission of the DATA packets from the second endpoint; determining, by the DFP device, a number of packets that can be received from the first endpoint during a remaining amount of time in a current bus interval; and transmitting, by the DFP device, at least one synthetic ACK IN packet to the first endpoint based on the number of packets, wherein each synthetic ACK IN packet includes a sequence number and a buffer count.

8. The method of claim 7, wherein determining the number of packets that can be received from the first endpoint during the remaining amount of time in the current bus interval includes:
   estimating an amount of latency based on a hub depth between the DFP device and a USB device associated with the first endpoint.

9. The method of claim 7, wherein transmitting at least one synthetic ACK IN packet to the first endpoint based on the number of packets includes determining the buffer count for each synthetic ACK IN packet based on the number of packets.

10. The method of claim 9, wherein the number of packets that can be received from the first endpoint during the remaining amount of time in the current bus interval is smaller than the buffer count in the ACK IN packet addressed to the first endpoint, and wherein the buffer count for at least one synthetic ACK IN packet is smaller than the buffer count in the ACK IN packet addressed to the first endpoint.

11. The method of claim 9, wherein the number of packets that can be received from the first endpoint during the remaining amount of time in the current bus interval is larger than the buffer count in the ACK IN packet addressed to the first endpoint, and wherein the buffer count for at least one synthetic ACK IN packet is larger than the buffer count in the ACK IN packet addressed to the first endpoint.

12. The method of claim 7, wherein detecting the end of transmission of the DATA packets from the second endpoint includes at least one of:
   detecting receipt of a total number of DATA packets requested by a previous ACK IN packet transmitted by the DFP device to the second endpoint; and
   detecting receipt of a DATA packet from the second endpoint with a last packet flag (LPF) set.

13. A downstream facing port device (DFP device), comprising: a USB downstream-facing port configured to be communicatively coupled to one or more USB devices; and an extension interface configured to be communicatively coupled to a non-USB extension medium; wherein the DFP device is configured to: receive, from the non-USB extension medium, an acknowledge (ACK) IN packet addressed to a first endpoint while receiving DATA packets from a second endpoint, wherein the ACK IN packet addressed to the first endpoint includes a sequence number and a buffer count; detect an end of transmission of the DATA packets from the second endpoint; determine a number of packets that can be received from the first endpoint during a remaining amount of time in a current bus interval; and transmit at least one synthetic ACK IN packet to the first endpoint based on the number of packets, wherein each synthetic ACK IN packet includes a sequence number and a buffer count.

14. The DFP device of claim 13, wherein determining the number of packets that can be received from the first endpoint during the remaining amount of time in the current bus interval includes:
   estimating an amount of latency based on a hub depth between the DFP device and a USB device associated with the first endpoint.

15. The DFP device of claim 13, wherein transmitting at least one synthetic ACK IN packet to the first endpoint based on the number of packets includes determining the buffer count for each synthetic ACK IN packet based on the number of packets.

16. The DFP device of claim 15, wherein the number of packets that can be received from the first endpoint during the remaining amount of time in the current bus interval is smaller than the buffer count in the ACK IN packet addressed to the first endpoint, and wherein the buffer count for at least one synthetic ACK IN packet is smaller than the buffer count in the ACK IN packet addressed to the first endpoint.

17. The DFP device of claim 15, wherein the number of packets that can be received from the first endpoint during the remaining amount of time in the current bus interval is larger than the buffer count in the ACK IN packet addressed to the first endpoint, and wherein the buffer count for at least one synthetic ACK IN packet is larger than the buffer count in the ACK IN packet addressed to the first endpoint.

18. The DFP device of claim 13, wherein detecting the end of transmission of the DATA packets from the second endpoint includes at least one of:
- detecting receipt of a total number of DATA packets requested by a previous ACK IN packet transmitted by the DFP device to the second endpoint; and
- detecting receipt of a DATA packet from the second endpoint with a last packet flag (LPF) set.

* * * * *